(12) United States Patent
Nuss

(10) Patent No.: US 9,634,939 B2
(45) Date of Patent: Apr. 25, 2017

(54) SYSTEM AND A METHOD FOR MANAGING WIRELESS NETWORKS

(71) Applicant: Intucell Ltd., Ra'anana (IL)

(72) Inventor: Ziv Nuss, Tsur Yigal (IL)

(73) Assignee: CISCO TECHNOLOGY, INC., San Jose, CA (US)

(*) Notice: Subject to any disclaimer, the term of this patent is extended or adjusted under 35 U.S.C. 154(b) by 76 days.

(21) Appl. No.: 14/158,722

(22) Filed: Jan. 17, 2014

(65) Prior Publication Data
US 2014/0204745 A1 Jul. 24, 2014

(30) Foreign Application Priority Data
Jan. 20, 2013 (IL) .......................................... 224332

(51) Int. Cl.
| | |
|---|---|
| H04W 4/00 | (2009.01) |
| H04W 36/00 | (2009.01) |
| H04L 12/803 | (2013.01) |
| H04W 28/08 | (2009.01) |
| H04W 48/18 | (2009.01) |

(52) U.S. Cl.
CPC ........... *H04L 47/122* (2013.01); *H04W 28/08* (2013.01); *H04W 48/18* (2013.01)

(58) Field of Classification Search
CPC ..... H04W 28/08; H04W 36/14; H04W 36/22; H04W 36/26; H04W 48/18; H04L 47/122
See application file for complete search history.

(56) References Cited

U.S. PATENT DOCUMENTS

| | | | | |
|---|---|---|---|---|
| 9,510,256 | B2* | 11/2016 | Krishna | ................ H04W 36/22 |
| 2005/0048972 | A1* | 3/2005 | Dorenbosch et al. | ........ 455/436 |
| 2008/0305786 | A1* | 12/2008 | Arumi et al. | .............. 455/426.1 |
| 2010/0222053 | A1* | 9/2010 | GiriSrinivasaRao et al. | .......................... 455/432.1 |
| 2011/0320588 | A1 | 12/2011 | Raleigh et al. | |
| 2012/0215911 | A1 | 8/2012 | Raleigh et al. | |
| 2012/0324100 | A1 | 12/2012 | Tomici et al. | |
| 2014/0003408 | A1* | 1/2014 | Chhabra | ............... H04W 48/16 370/338 |
| 2014/0160937 | A1* | 6/2014 | Richards | ....................... 370/236 |
| 2014/0162661 | A1* | 6/2014 | Shaw | .................... H04W 36/22 455/439 |

(Continued)

FOREIGN PATENT DOCUMENTS

EP 2757826 7/2014

OTHER PUBLICATIONS

EPO May 9, 2014 Extended European Search Report from European Application No. EP14151680.7.

(Continued)

*Primary Examiner* — Man Phan
*Assistant Examiner* — Ryan Kavleski
(74) *Attorney, Agent, or Firm* — Patent Capital Group

(57) ABSTRACT

A method for reducing load in a cellular communication network, within at least one cell that covers an area which overlaps an area that is at least partially covered by one or more Wi-Fi networks, comprises the steps of: (a) monitoring traffic load within the at least one cell; (b) providing information to a plurality of mobile stations operative in a cellular mode which are currently communicating via their respective at least one cell, to enable one or more of the plurality of mobile stations to switch to their Wi-Fi operating mode, wherein the plurality of mobile stations are capable of operating both in a cellular operating mode and in a Wi-Fi operating mode, and wherein said information indicates to the receiving mobile stations to perform a switch to its Wi-Fi operating mode; (c) for at least some of said plurality of mobile stations, switching their operation mode to Wi-Fi mode.

15 Claims, 7 Drawing Sheets

(56) References Cited

U.S. PATENT DOCUMENTS

2014/0204746 A1* 7/2014 Sun et al. .................... 370/235
2015/0208337 A1* 7/2015 Wuellner ............. H04W 48/20
                                                         370/252
2015/0282058 A1* 10/2015 Forssell ............... H04W 48/18
                                                         455/552.1

OTHER PUBLICATIONS

"ETSI TS-123-401 V10.9.0 (Jan. 2013) Technical Specification: LTE; General Packet Radio (GPRS) enhancements for Evolved Universal Terrestrial Radio Access Network (E-UTRAN) access (3GPP TS 23.401 version 10.9.0 Release 10)," ETSI, European Telecommunications Standards Institute 2013, 650 Route des Lucioles, F-06921 Sophia Antipolis Cedex-France, Jan. 2013, 280 pages.

"ETSI TS-123-402 V10.8.0 (Sep. 2012) Technical Specification: Universal Mobile Telecommunications System (UMTS); LTE; Architecture enhancements for non-3GPP accesses (3GPP TS 23.402 version 10.8.0 Release 10)," ETSI, European Telecommunications Standards Institute 2012, 650 Route des Lucioles, F-06921 Sophia Antipolis Cedex-France, Sep. 2012, 234 pages.

ILPO Oct. 8, 2015 Israel Patent Office First Office Action from Israeli Patent Application 5684-003.

* cited by examiner

SYSTEM AND A METHOD FOR MANAGING WIRELESS NETWORKS

CROSS-REFERENCE TO RELATED APPLICATIONS

This application is based on and claims the benefit of priority under 35 U.S.C. §119 from Israeli Patent Application No. 224332 filed in the Israel Patent Office on Jan. 20, 2013, entitled "A SYSTEM AND A METHOD FOR MANAGING WIRELESS NETWORKS," the contents of which are hereby incorporated by reference in their entirety.

TECHNICAL FIELD

The invention relates to a system and a method for managing wireless networks, and in particularly to a system and a method for integrating operations of cellular and Wi-Fi communication systems.

BACKGROUND

In recent years, several trends have been influencing the evolution of next generation mobile broadband cellular networks.

Among the major influential factors one may find the following:
  (i) The fast adaptation and rollout of mobile broadband cellular networks (3G and LTE) by MNOs;
  (ii) The widespread of Wi-Fi hot spots providing local high speed data broadband connectivity, and the incorporation of Wi-Fi capabilities in most of the currently used portable mobile broadband devices;
  (iii) "Data explosion" which has been ramping up ever since the introduction of the iPhone® in 2007 driving the need for new methods that would allow more cost effective delivery of mobile broadband services;
  (iv) The scarcity of licensed spectrum to enable provisioning of 3G/LTE data services that meet the growing demand for mobile broadband data services;
  (v) The fact that most of data traffic is being generated indoors and the cellular industry trend of introducing low power, localized coverage, small cells, as an effective means for cellular network densification (aka "heterogeneous networks");
  (vi) Mobile devices evolution which enables the introduction of multi technology devices at lower cost for the end users thereby enabling simultaneous connectivity of the user equipment (UE) to both Wi-Fi and cellular networks.

In view of these trends, 3GPP has identified the potential in having a tighter integration between native cellular service in licensed spectrum and Wi-Fi service over unlicensed spectrum, and such framework has been introduced in 3GPP R10 within the scope of ANDSF (Access Network Discovery and Selection Function) in the EPC.

The new EPC architecture introducing ANDSF is described in 3GPP Specification TS 23.401 entitled "General Packet Radio Service (GPRS) enhancements for Evolved Universal Terrestrial Radio Access Network (E-UTRAN) access" and in 3GPP Specification TS 23.402 entitled "Architecture enhancements for non-3GPP accesses".

FIG. 1 describes the reference architecture used by the 3GPP forum with ANDSF for trusted Wi-Fi and cellular integration. However, there are still a number of challenges that have to be overcome in order to achieve an effective and reliable Wi-Fi/Cellular integrated solution. Some of these challenges are:
  a) To monitor and compare Wi-Fi vs. cellular performance at the levels of the device/cell. From the Mobile Network Operator ("MNO") standpoint, it is desired that the user will get the best possible quality of experience ("QoE") in accordance with the service consumed and the user priority level, under the constraints of load management.
  b) To enable scalable real time localized control of device steering between cellular/Wi-Fi networks, when devices are in active mode as well as in idle mode. In order to effectively manage Wi-Fi offloading, the network is required to control millions of users, individually, according to each user varying conditions, and according to network varying local conditions. Achieving that goal in a scalable manner and without inducing a further load is yet another challenge that needs to be overcome.
  c) To measure QoE in Wi-Fi network. The challenge lies primarily in the fact that there is no native reverse control channel in Wi-Fi network to be used for reporting back the QoE experienced by the user.
  d) To carry out an effective divert (offload) traffic from cellular network to Wi-Fi network and to divert the traffic back from Wi-Fi network to cellular network. Different users at different locations might impose different load conditions upon the cell radio resources. For example, a user located at a cell edge is likely to load the cell more than a user located at the cell core, while both users consume the same amount of data over the same service type. The challenge therefore lies in achieving an effective offloading and diverting back policy in view of the complex radio interface realities of 3G and LTE.
  e) Coordination between various Load Balancing functions and ANDSF, according to MNO policy (intra 3G/LTE, IRAT, PCC, ANDSF). It is likely that the MNO may activate simultaneously many load balancing features, such as intra/inter system load balancing and policy enforcement functions carried out by PCRF/PCEF platforms in the EPC. Overlaying ANDSF and Wi-Fi offload without ensuring suitable coupling with these methodologies might lead to non-optimal network resources utilization and actually might result in loss of revenues to the MNO due to different revenues models in Wi-Fi vs. cellular networks; and
  f) Network triggered mobility procedures. Current state of the art regarding cellular and Wi-Fi integration solutions assume that when in Wi-Fi mode, mobility decisions are taken by the UE via the CM (Connection Manager). However, there might be a need for strict network control over users' mobility between the different layers. This might be required either to support delay sensitive (eg CS) applications continuity and quality in cell edge environment as well as to support Load Balancing procedures between Wi-Fi and Cellular and vice versa.

In current cellular mobile broadband systems the achievable data rates are highly dependent on the users' positions in the network. Even though it is of great importance to deliver the same user experience across the whole cellular network in order to satisfy the users' expectations, still, a considerable gap is observed between cell-edge and cell-core performance due to inter-cell interference, which poses the main limitation of state-of-the art mobile networks.

Therefore, there is a need to improve the way cellular networks and Wi-Fi networks are integrated, and particularly the Load and Quality analysis and management when the users are steered (while being in active mode and in idle mode) between these two technologies, namely Wi-Fi and Cellular.

SUMMARY OF THE DISCLOSURE

The disclosure may be summarized by referring to the appended claims.

It is an object of the present invention to provide a method and apparatus to enable reducing traffic load in a cellular network by diverting traffic to a Wi-Fi network covering an area which is at least partially co-located with one or more cells of the cellular network.

It is another object of the present invention to provide a method and apparatus to enable provisioning of information to mobile stations for determining whether to affect a switch from their cellular operating mode to their Wi-Fi operating mode.

It is still another object of the present invention to provide a method and apparatus to enable diverting traffic of specific mobile stations, based on their associated radio conditions, to a Wi-Fi network, without affecting other mobile stations (for example differentiating between cell edge users to cell core users).

It is yet another object of the present invention to provide a method and apparatus to enable providing messages to a mobile station currently operating in a Wi-Fi operating mode, via a cellular network.

Other objects of the present invention will become apparent from the following description.

According to a first embodiment there is provided a method for reducing load in a cellular communication network within at least one cell that covers an area which is co-located with an area that is at least partially covered by one or more Wi-Fi access points associated with one or more Wi-Fi networks, the method comprises the steps of:
  (a) monitoring current traffic load within the at least one cell;
  (b) providing information to a plurality of mobile stations operative in a cellular mode which are currently communicating via their respective at least one cell, to enable one or more of the plurality of mobile stations to switch to their Wi-Fi operating mode, wherein the plurality of mobile stations are capable of operating both in a cellular operating mode and in a Wi-Fi operating mode, and wherein said information provides an indication for each of the receiving mobile stations that it may or should (as the case may be) perform a switch to its Wi-Fi operating mode;
  (c) for one or more of the plurality of mobile stations, switching their wireless operation mode to Wi-Fi mode.

According to another embodiment, step (b) comprises providing (e.g. to a central entity, such as a centralized Self Optimizing Network, a.k.a. "cSON") a load threshold (i.e. a traffic load related indication) and in response to exceeding the load threshold provided, determining (e.g. by that central entity) for at least some of the plurality of mobile stations operative in a certain area, one or more preferred wireless networks (e.g. Wi-Fi networks) operative in that certain area to which the relevant mobile station(s) may switch. The determination may either be conveyed to the mobile stations by their respective base stations (or eNodeBS on case of an LTE network), or taken by the mobile station based on information it receives from its respective base station. Also, it could be that for one cellular network some of the mobile stations will receive the determination from their base station while other mobile stations operating at the same cellular network will take the decision by themselves as explained above. Also, in addition to the above, a switching command for the UEs (conveyed for example via the ANDSF platform) may be generated by a central entity, such as a "cSON", adapted to assess the traffic load in the cellular network. This switching command may be generated in response to a determination made by that central entity, that a pre-defined load threshold had been exceeded.

In accordance with still another embodiment, the information provided comprises identification of one or more Wi-Fi access points with which the receiving mobile station may communicate after it has switched to its Wi-Fi mode. Preferably, the information comprises identifications of a plurality of Wi-Fi access points located respectively at the vicinity of the mobile stations, to allow each of the mobile stations to select another Wi-Fi access point upon moving from one location area to another, while operating at its Wi-Fi operating mode. As will be appreciated by those skilled in the art, the term "location area" as used herein throughout the specification and claims should be understood to be an analogous term to the terms "routing area" and/or "tracking area", which are also used in the art.

By yet another embodiment, the information enables the mobile station which receives that information, to determine whether there is a need for it to switch to its Wi-Fi operating mode.

According to another embodiment, the method provided further comprises a step of notifying at least one of the mobile stations that had switched to Wi-Fi operating mode, to return to its cellular operating mode.

By yet another embodiment, the notification to the at least one of the mobile stations to return to its cellular mode, is included in an SMS or CBS ("Cell Broadcast Service") sent to the at least one mobile station along a path extending at least partially in the cellular communication network, while the at least one mobile station is still at its Wi-Fi operating mode.

In accordance with still another embodiment, the notification to the at least one of the mobile stations to return to its cellular operating mode, is preceded by a message sent by the at least one mobile station indicating that it has been experiencing poor communication conditions at the Wi-Fi network.

In accordance with still another embodiment, the method provided further comprises a step of classifying access points belonging to the one or more Wi-Fi networks in accordance with their proximity to the core or to the edge of the respective at least one cell.

Preferably, the information that indicates to the receiving mobile station to perform a switch to its Wi-Fi operating mode, is sent only to mobile stations that are currently located at the proximity of the edge of the at least one cell, and the information comprises identifications of one or more Wi-Fi access points that had been classified as being at the vicinity of the edge of the at least one cell.

According to another aspect, there is provided a communication apparatus (e.g. a communication platform such as a server) operative to reduce load in at least one cell of a cellular communication network wherein the at least one cell covers an area which is co-located with area that is at least partially covered by one or more Wi-Fi networks, the communication apparatus comprises:

(a) one or more receivers operative to:
  (a1) receive information from the cellular communication network regarding current traffic load in the at least one cell; and
  (a2) receive information from the one or more Wi-Fi networks co-located with the at least one cell, regarding the location of access points associated with said one or more Wi-Fi networks;
(b) one or more processors operative to enable provisioning of information to a plurality of mobile stations operative in a cellular mode which are currently communicating via their respective at least one cell, to enable one or more of the plurality of mobile stations to switch to their Wi-Fi operating mode, wherein the plurality of mobile stations are capable of operating both in a cellular operating mode and in a Wi-Fi operating mode, and wherein said information includes an indication for the receiving mobile station to perform a switch to its Wi-Fi operating mode; and
(c) one or more transmitters operate to convey information generated by said one or more processor towards said plurality of mobile stations operative in a cellular mode.

The functionalities associated with the communication apparatus according to this aspect of the invention, may be included for example as part of the functionalities of an improved cSON. According to another embodiment of this aspect, the information generated by the processor for the plurality of mobile stations comprises a congestion threshold to enable each of the plurality of mobile stations, based on its own measurements of its radio conditions, to determine whether and/or when to perform a switch to its Wi-Fi operating mode. The term "congestion threshold" as used herein through the specification and claims should be understood as a value of a selected parameter (e.g. the mobile station Quality of Experience (QoE) or certain radio conditions (e.g. data rate) as may be reflected from the mobile station own measurements. Thus according to this embodiment, if the mobile station determines that the measured value of the congestion threshold is higher than the value of the that parameter which had been provided to the mobile by the central entity such as a cSON, it may initiate a search for a Wi-Fi AP to switch to, preferably based on a list of preferred APs that had already been provided to that mobile station by the central entity.

By yet another embodiment, the information generated by the processor comprises identification of one or more Wi-Fi access points with which the receiving mobile station may communicate after it has switched to its Wi-Fi operating mode. Preferably, the information comprises identifications of a plurality of Wi-Fi access points located respectively at the vicinity of the mobile stations, to allow each of the mobile stations to select another Wi-Fi access point upon moving from one location area to another while operating at its Wi-Fi operating mode.

In accordance with still another embodiment, the processor is further operative to enable provisioning to at least one of the mobile stations that had switched to the Wi-Fi operating mode, a notification to return to its cellular operating mode. Preferably, the notification to the at least one of the mobile stations to return to its cellular operating mode, is included in an SMS sent to the at least one mobile station along a path extending at least partially in the cellular communication network, while the at least one mobile station is still at its Wi-Fi operating mode. In addition, the notification to the at least one of the mobile stations to return to its cellular mode, may be provided in response to receiving a message sent by the at least one mobile station indicating that it is experiencing poor communication conditions in said Wi-Fi network.

According to yet another embodiment, the processor is further operative to classify access points belonging to the one or more Wi-Fi networks in accordance with their proximity to the core or to the edge of the at least one cell. In addition or in the alternative, the access points may be classified according to their historical performance and/or impact achieved while offloading traffic from a respective macro cell.

In accordance with still another embodiment, the information that indicates to the receiving mobile station to perform a switch to its Wi-Fi operating mode, is sent only to mobile stations that are currently located at the proximity of the edge of the at least one cell, wherein the term "edge" as used herein relates to mobile stations experiencing a relatively high path loss radio conditions, which typically lead to poor radio link quality. Preferably, the information comprises identifications of one or more Wi-Fi access points that had been classified as being at the vicinity of the edge of the at least one cell.

Other aspects of the present invention such as certain features of the communication apparatus and a communication system comprising the integrated cellular network and the Wi-Fi network, which are adapted to operate in accordance with the principles described herein, mutatis mutandis, are encompassed within the scope of the present invention.

BRIEF DESCRIPTION OF THE DRAWINGS

For a more complete understanding of the present invention, reference is now made to the following detailed description taken in conjunction with the accompanying drawings wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

Figure 1:
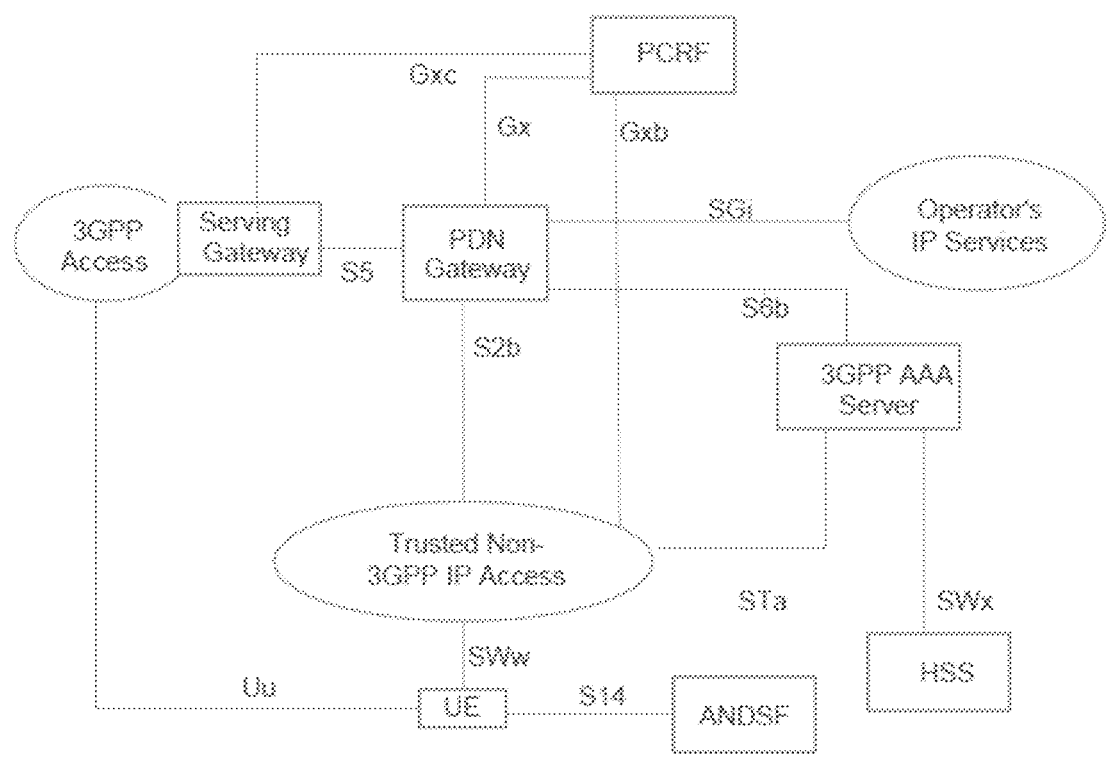
FIG. 1—is a prior art presentation of a 3GPP R10 EPC access via trusted Wi-Fi including ANDSF.
Figure 2:
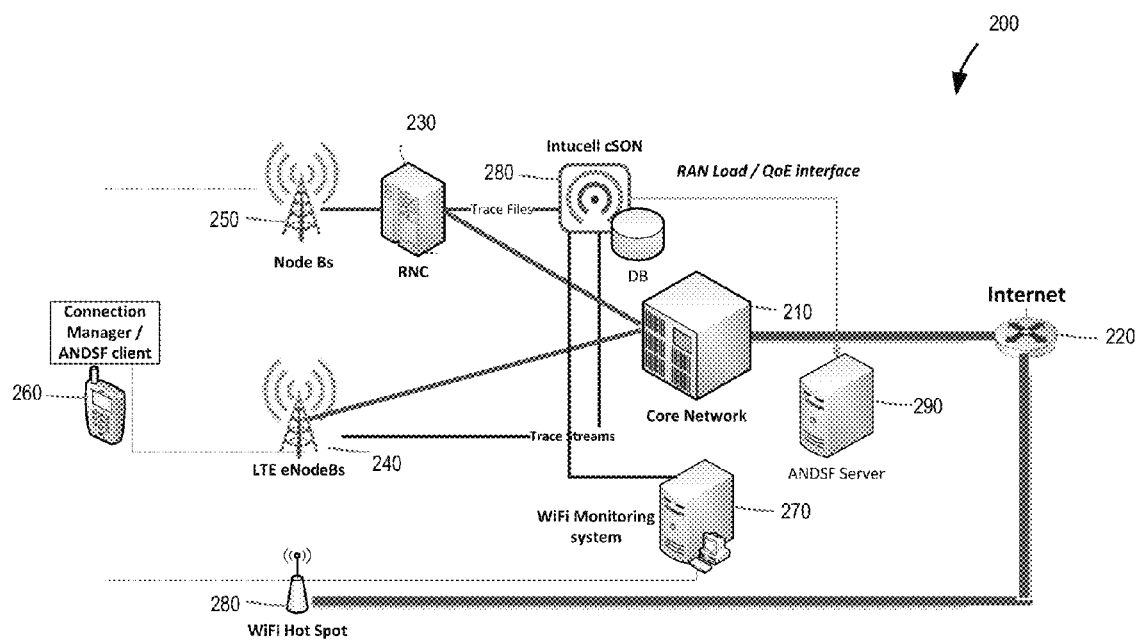
FIG. 2—illustrates a schematic example of a simplified system operative to provide an integrated cellular—Wi-Fi solution.

Let us first consider FIG. 2, which illustrates a schematic example of a simplified system 200 operative to provide an integrated cellular—Wi-Fi solution.

The system in this example comprises a cellular part which comprises a core network server 210 communicating with the Internet 220 on one hand and with RNC 230 and/or with LTE eNodeBS 240 on the other hand. In this example the cellular system will be referred to as comprising both RNC 230 and LTE eNodeBS 240, but as will be appreciated by those skilled in the art, in many cases the system will comprise only one of these two types, depending on the standard with which the cellular system is compatible. In the case where communications are carried through RNC 230, the RNC is connected to base stations 250 each of which in turn communicates with a plurality of mobile subscribers (MS) 260. In the case where communications are carried through LTE eNodeBS 240, the latter entities communicate directly, each with a plurality of MSs 260.

The Wi-Fi part of system 200 comprises a Wi-Fi monitoring system 270 being in communication with a plurality of Wi-Fi hotspots 280, to which the plurality of MSs 260 may also connect.

In addition system 200 comprises a centralized Self Optimizing Network ("SON") server 280 which is operative to receive information from RNC 230 (e.g. trace files), information from the LTE eNodeBS 240 (e.g. trace stream) and from Wi-Fi monitoring system 270. The information is processed by the cSON server 280 (which typically comprises a database) and the outcome is forwarded to Access Network Discovery and Selection Function ("ANDSF") server 290.

The centralized SON server 280 relies on an accurate and dynamic information obtained from the Radio Access Network ("RAN") layer, gathered ad updated on near real time from the cellular part of the network (3G and LTE).

The cSON in this exemplified system, relies on augmenting the information retrieved from the RAN layer with dynamic information about the Wi-Fi Access Points ("APs") of trusted and un-trusted Wi-Fi networks (according to MNO policies), and optionally on advanced modeling of the correlation between the cellular and Wi-Fi networks on a per location (per cell/AP) basis.

Basically, the approach that will be demonstrated in this example uses a parallel computational entity ("load management server") which is connected to the ANDSF server, to provide the load and quality analysis functions required to effectively manage Cellular/Wi-Fi traffic balancing.

Figure 3:
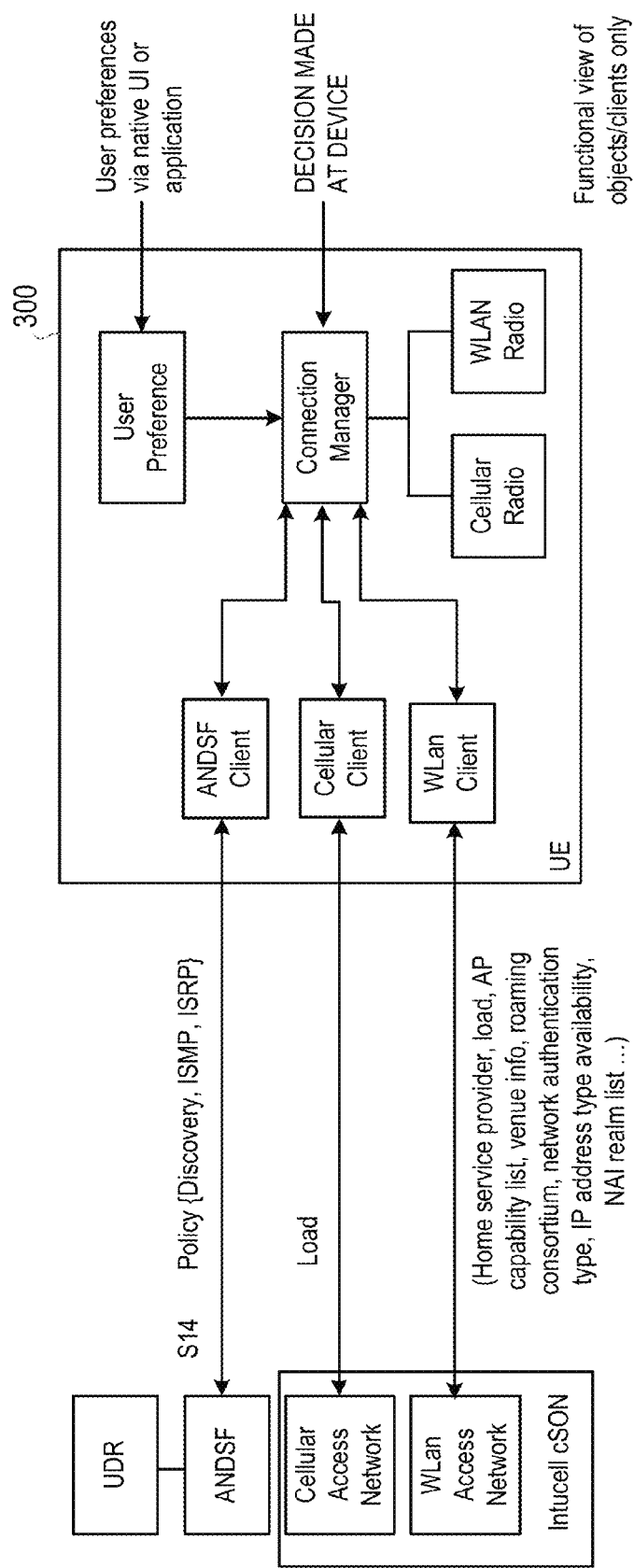
FIG. 3—presents a block diagram illustrating an embodiment of implementing the method provided by the present invention for integrating cellular and Wi-Fi systems.

FIG. 3 presents a block diagram illustrating one embodiment of implementing the method provided by the present invention for integrating cellular and Wi-Fi systems.

One of the functionalities provided by this embodiment of the present invention is the capability to monitor and compare Wi-Fi performance to cellular performance at the device and/or at the cell level.

To do that, the system dynamically collects information from UTRAN/EUTRAN systems, including information that relates to current load status of each cell, as well as the load status of other resources (e.g. Iub/X2/S1 loading information based on collected PMs. This information is then used according to the present example to classify each cell's state by applying a loading scale (e.g. Red/Yellow/Green) while implementing different policies by the ANDSF server (messages for implementing these policies are provided through S14 interface or via any other effective communication that the ANDSF server uses to provide NRT information to the users—e.g. CBS).

One of the advantages of the method encompassed by this embodiment is, that it provides added value mostly in cases where it is not enough to understand the real loading situation of the network based on downlink (DL) measurements alone, which are taken by the user equipment (UE). Typical examples can be excessive UL loading (RoT or NR), transmission link loading, and the like. Additionally, the method provided also enables applying sub-classification by which loading relates to different types of services (e.g. HS load vs. CS load).

Thus, the UE device 300 illustrated in FIG. 3, comprises a connection manager (implemented for example by a processor) which is operative to:

a. receive and send policy related messages from the ANDSF server, such as: Discovery, ISMP, ISRP, etc.;
b. receive and send load related information from/to the cellular access network;
c. receive and send information from the home service provider (e.g. AP capacity list, venue information, roaming consortium, network authentication type, IP address type availability, and the like; and
d. receive user preferences (e.g. via native user interface (UI) or embedded application).

Based on the above information, the connection manger of the UE may take a decision as to whether the preferred way of communication for the UE is via the cellular network or via the Wi-Fi network.

In order for the above described system to provide scalable real time control of MSs switching between cellular/Wi-Fi networks while being in active mode or in idle mode, according to one embodiment, the MNO uses a mechanism to provide NRT policy updates (including changes in AP lists etc) to all users.

According to another embodiment, the system is further operative to provide QoE measurement for Wi-Fi users and/or to enable effective offload of users from their cellular network to a Wi-Fi network. By this embodiment, the APs are ranked by associating an "offloading score" therewith, which relates to their known influence on cellular cells loading.

One way of implementing this feature is by implementing the following steps.

In step #1, the APs are graded in accordance with their distance to the core/edge of the nearest cellular cell, in order to allow differentiation between access points (APs) located near the cell core and access points located near the cell edge. This differentiation allows giving priority to offloading MSs that are currently located at the cell edge of the cellular network over MSs currently located at the cell core, in view of the fact that users located at the cell edge, typically consume more network resources than those which are located at the cell core.

Figure 5:
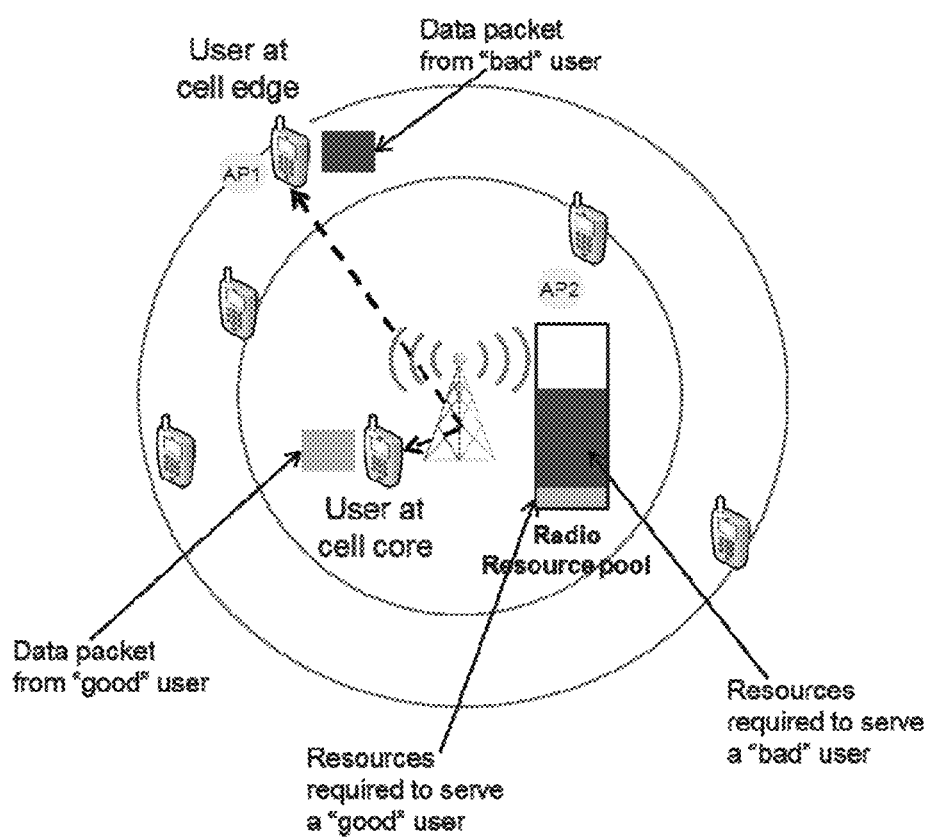
FIG. 5—illustrates access points of Wi-Fi network co-located with a cell of the cellular network at the cell core and at the cell edge.

The next step involves further profiling the APs found according to step #1 to be located near/at the cell edge, as presented for example in FIG. 5.

FIG. 5 demonstrates access points co-located with a cell of the cellular network. As may be seen in this Fig., some of the access points are located closer to or at the cell's core while others to/at the cell edge. The APs are ranked as explained above according to their distance from the cell core/edge which allows treating differently access points located at the cell core (such as AP2 in FIG. 5) from access points located at the cell edge (such as AP1 in FIG. 5).

Preferably, one or more of the access points located at or near the cell edge (and which will be referred to herein throughout the specification and claims as "cell edge access points") are selected for offloading a mobile station from the cellular network to the Wi-Fi network due to the fact that users located on cell edges consume more cell resources than those in cell core.

The cSON system sends the ANDSF server a list of APs which may preferably be updated at a certain rate, which will reflect the current preferred APs for the mobile stations to select. Suppose the cell load in a 3G network is moderate but still a request for offloading users has been triggered, in this case, for example, the cSON will inform the ANDSF server to transmit an offloading request only to users that are within the geographical proximity of AP1 (depending on operator policy). These users (or rather their mobile stations will receive an indication to connect to AP1 of the Wi-Fi network, following which these mobile stations will comply with this indication and switch to the Wi-Fi network. At the same time, mobile stations which are located near AP2 will not switch to the Wi-Fi network, because the above mentioned indication will not be included in the SSIDs provided by ANDSF server to mobile stations located within this cell.

In view of the above, the ANDSF server may send SSID list updates more frequent to cells being in cellular congestion, while for other cells there may be a default list of APs. This of course may depend on the MNO policy.

Preferably, a further profiling is done according to historical performance which may be collected for example by cSON 280 of FIG. 2 and stored in its database (DB). In this example, an offloading score is granted to each AP, according to its effectiveness in reducing (offloading) the load from the cellular cell. In the following example the offloading score is presented as a parameter having a discrete value (high/med/low), although as will be appreciated by those skilled in the art, it can be done as a value taken from a continuous scale.

TABLE 1

Offloading score for cell edge APs in a cSON DB

| | Offloading score | | | | | | | |
|---|---|---|---|---|---|---|---|---|
| | Cell state = green | | | Cell state = yellow | | | Cell state = red | | |
| AP ID | Morning | Noon | Night | Morning | Noon | Night | Morning | Noon | Night |
| AP#1 | High | Low | Low | Med | Med | Med | Low | High | high |
| AP#2 | ... | ... | ... | ... | | | | | |

In addition or in the alternative, another table may be maintained, representing the QoE measurements gathered from each one of the APs, again the table presented hereinbelow, demonstrates the score with relation to the time of day (obviously other profiling parameters can be also defined and implemented).

In the following table (Table 2) a QoE score is introduced per each AP. This score depends on the availability of such information from the Wi-Fi's QoE gathering system or on receiving and collecting UE reports which provide information on the Wi-Fi quality of the various APs.

TABLE 2

QoE score for APs in a Wi-Fi system

| | QoE score | | | | | | | |
|---|---|---|---|---|---|---|---|---|
| | Cell state = green | | | Cell state = yellow | | | Cell state = red | | |
| AP ID | Morning | Noon | Night | Morning | Noon | Night | Morning | Noon | Night |
| AP#1 | High | Low | Low | Med | Med | Med | Low | High | high |
| AP#2 | | | | | | | | | |

Next, a composite score representing the priority of offloading cellular traffic from each cell to each specific AP may be computed and.

Composite offload score (per each AP) may be represented by:

$$K1 \times \text{Offloading score} + K2 \times QoE \text{ score}$$

where K1 and K2 are constants.

Figure 6:
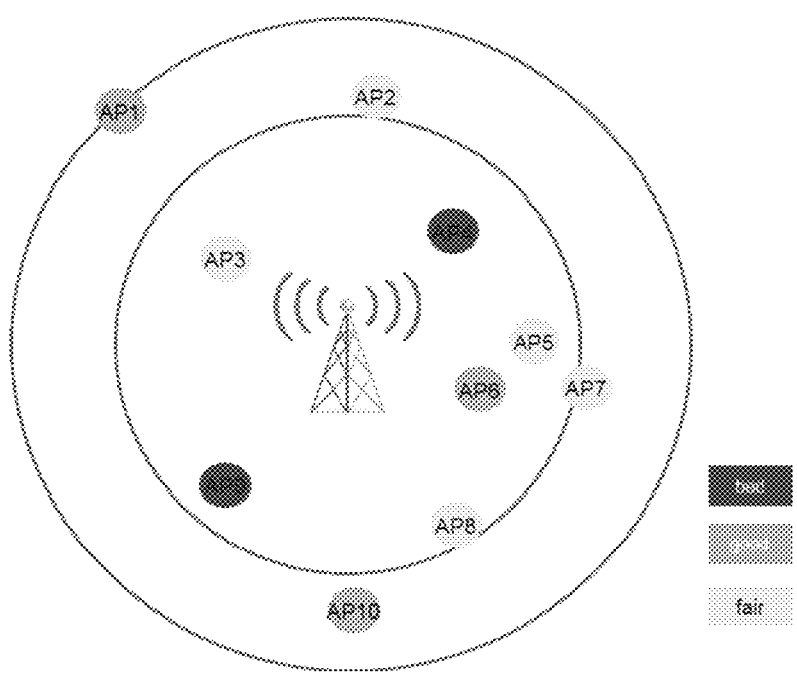
FIG. 6—exemplifies a layout of access points within a cell, classified according to their composite offload score.
Figure 7:
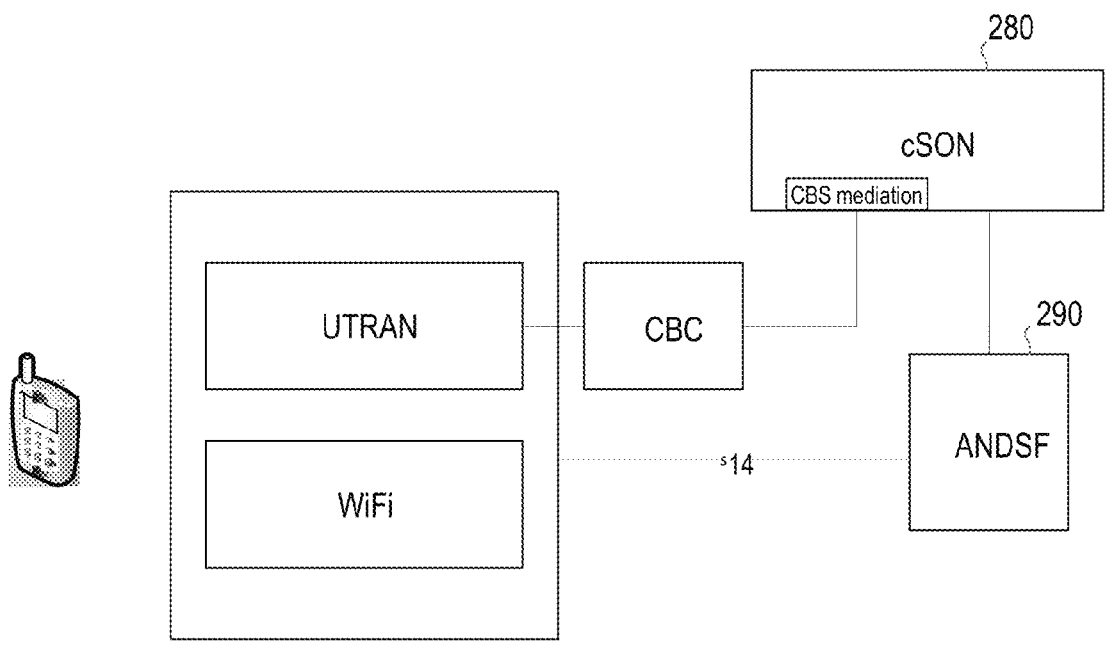
FIG. 7—demonstrates an example of a cSON system which supports the functionality by which ANDSF commands are adapted for transmission towards the UEs side.

FIG. 6 exemplifies a layout of APs within a cell colored according to composite offload score (in this example by using 3 colors' code).

Then, a prioritized list of APs is provided by cSON server 280 to the ANDSF server 290 which in turn will use this information to update the policies provided to the UEs via S14 interface (or by any other applicable method known in the art per se).

In addition or in the alternative, the cSON server may coordinate between various Load Balancing functions activated in the network and the ANDSF server in accordance with MNO policy (e.g. intra 3G/LTE, IRAT, PCC, ANDSF). Such coordination may be carried out for example by setting thresholds and parameters to enable determining the way the users will operate. For example, the cSON server can ensure that all UMTS carriers are well balanced prior to initiating offloading to Wi-Fi.

Figure 4:
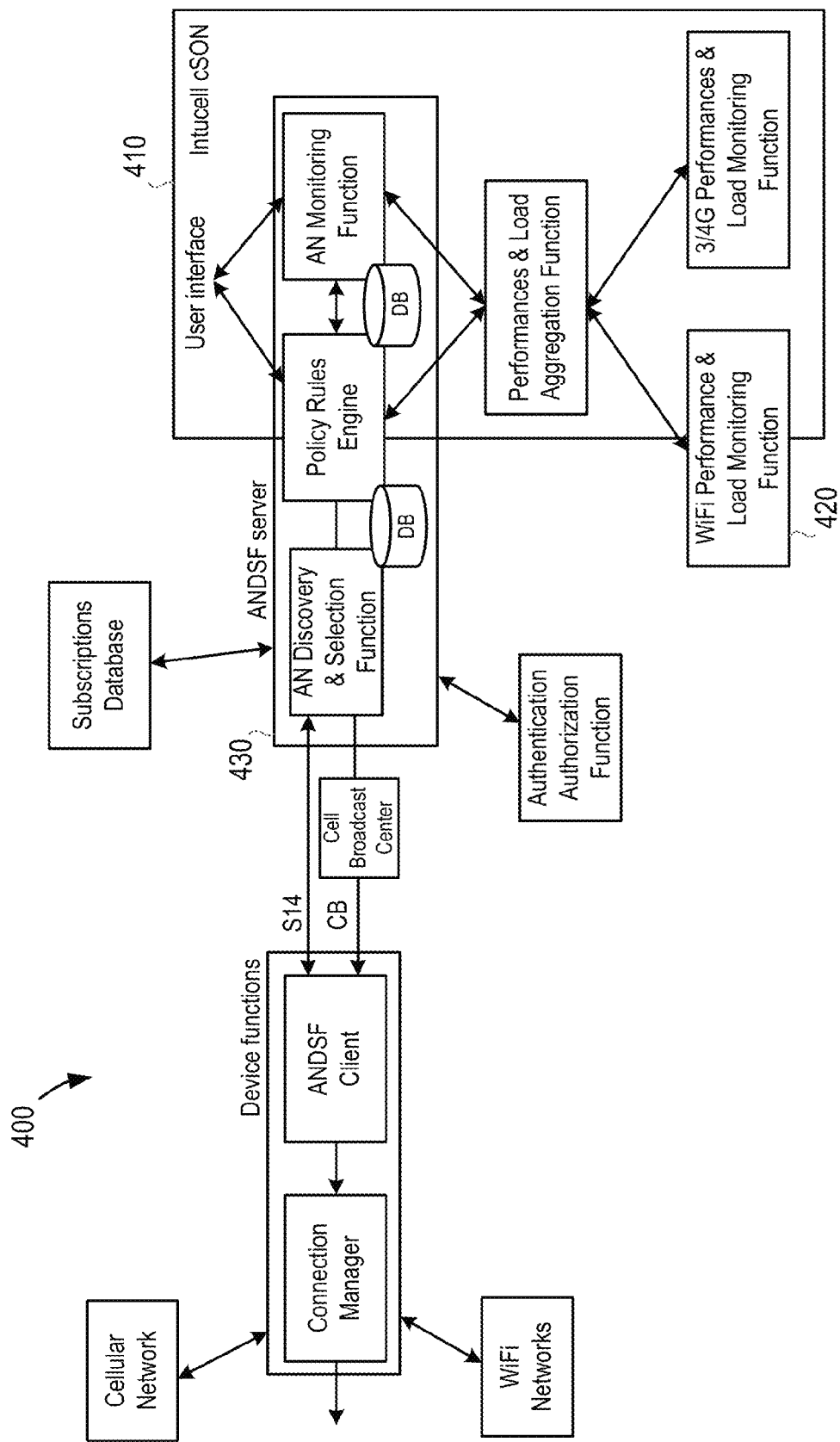
FIG. 4—demonstrates a block diagram showing the functionality of a system construed in accordance with an embodiment of the present invention.

FIG. 4 presents a block diagram shown the functionality of a system 400 construed in accordance with an embodiment of the present invention, which is useful in monitoring the access network, wherein the monitoring relies on the RAN visibility layer augmented with Wi-Fi information gathered from ANDSF server and/or any other Wi-Fi monitoring platforms.

Additionally, part of the solution provided may include a user interface to enable setting the ANDSF related policies as per loading and QoE considerations. Platform 410 includes Wi-Fi performance and load monitoring module 420 which uses measurements collected by an external Wi-Fi performance and load monitoring entity, or can interface directly with the ANDSF server 430 to utilize clients' capabilities to collect such information, store it and use it within the dedicated cSON cellular/Wi-Fi integration DB. This method can be implemented also for getting information and to control the offload to non-managed APs.

According to yet another embodiment represented in FIG. 5, the cSON system described hereinabove may also support the functionality by which ANDSF commands are adapted for their transmission towards the UEs side within a Cell Broadcast ("CBS") frame. In this case, the cSON system will communicate with any type of ANDSF command, and will enable sending the ANDSF communications towards the UE side, via the CBS system (using the CBC—Cell Broadcast Center).

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for reducing load in a cellular communication network within at least one cell that covers an area which overlaps an area that is at least partially covered by one or more Wi-Fi networks, the method comprises the steps of:
   (a) prioritizing a plurality of Wi-Fi access points belonging to the one or more Wi-Fi networks according to their proximity to a core or an edge of the area covered by the at least one cell, wherein Wi-Fi access points located in a vicinity of the edge of the area covered by the at least one cell are at a higher priority than access points located in a vicinity of the core of the area covered by the at least one cell;
   (b) monitoring traffic load within the at least one cell, wherein the monitoring is performed, at least in part by a server;
   (c) determining a composite offload score for each of the plurality of Wi-Fi access points, wherein the composite offload score is based, at least in part, on an effectiveness of each Wi-Fi access point to offload traffic and in relation to a time of day and a quality of experience (QoE) score associated with each Wi-Fi access point in relation to the time of day;
   (d) providing information to a plurality of mobile stations operative in a cellular mode which are currently communicating via their respective at least one cell, to enable one or more of the plurality of mobile stations to switch to their Wi-Fi operating mode, wherein the plurality of mobile stations are capable of operating both in a cellular operating mode and in a Wi-Fi operating mode, and wherein the information indicates to the plurality of mobile stations receiving the information to perform a switch to their Wi-Fi operating mode based, at least in part, on the priority and the composite offload score of each of the plurality of Wi-Fi access points; and
   (e) for at least one of the plurality of mobile stations, switching its operation mode to Wi-Fi operating mode.

2. The method of claim 1, wherein step (d) comprises providing a load threshold and determining for at least one of the plurality of mobile stations operative in a certain area, preferred wireless networks operative in that certain area.

3. The method of claim 1, wherein the information comprises identification of one or more Wi-Fi access points with which a particular mobile station receiving the information may communicate after it has switched to its Wi-Fi operating mode.

4. The method of claim 3, wherein the information comprises identification of one or more of the plurality of Wi-Fi access points located respectively in a vicinity of each of the plurality of mobile stations, to allow one or more of the plurality of mobile stations to select another Wi-Fi access point upon moving from one location area to another, while operating at its Wi-Fi operating mode.

5. The method of claim 1, wherein the information enables a particular mobile station receiving that information, to determine whether there is a need for it to switch to its Wi-Fi operating mode.

6. The method of claim 1, further comprising a step of notifying at least one of the plurality of mobile stations that had switched to its Wi-Fi operating mode, to return to its cellular operating mode.

7. The method of claim 6, wherein the notification to the at least one of the plurality of mobile stations to return to its cellular operating mode, is included in a Cell Broadcast Service (CBS) sent to the at least one of the plurality of mobile stations along a path extending at least partially in the cellular communication network, while the at least one of the plurality of mobile stations is still at its Wi-Fi operating mode.

8. The method of claim 6, wherein the notification to the at least one of the plurality of mobile stations to return to its cellular mode, is preceded by a message sent by the at least one of the plurality of mobile stations indicating that it is experiencing poor communication conditions in said Wi-Fi network.

9. A communication apparatus operative to reduce load in at least one cell of a cellular communication network wherein the at least one cell covers an area which overlaps an area that is at least partially covered by one or more Wi-Fi networks, the communication apparatus comprises:
   (a) one or more receivers that operate to:
      (a1) receive information from the cellular communication network regarding current traffic load at the at least one cell; and
      (a2) receive information from the one or more Wi-Fi networks co-located at least partially with the at least one cell, regarding locations of a plurality of Wi-Fi access points belonging to the one or more Wi-Fi networks;
   (b) one or more processors that operate to:
      (b1) determine a priority of the plurality of Wi-Fi access points belonging to the one or more Wi-Fi networks according to their proximity to a core or an edge of the area covered by the at least one cell, wherein Wi-Fi access points located in a vicinity of the edge of the area covered by the at least one cell are at a higher priority than access points located in a vicinity of the core of the area covered by the at least one cell;
      (b2) determine a composite offload score for each of the plurality of Wi-Fi access points, wherein the composite offload score is based, at least in part, on an effectiveness of each Wi-Fi access point to offload traffic and in relation to a time of day and a quality of experience (QoE) score associated with each Wi-Fi access point in relation to the time of day;

(b3) enable provisioning of information to a plurality of mobile stations operative in a cellular mode which are currently communicating via their respective at least one cell, to enable one or more of the plurality of mobile stations to switch to their Wi-Fi operating mode, wherein the plurality of mobile stations are capable of operating both in a cellular operating mode and in a Wi-Fi operating mode, and wherein the information comprises an indication for the plurality of mobile stations receiving the information to perform a switch to their Wi-Fi operating mode based, at least in part on the priority and the composite offload score of each of the plurality of Wi-Fi access points; and (c) one or more transmitters that operate to convey information generated by said one or more processor towards said plurality of mobile stations operative in a cellular operating mode.

10. The communication apparatus of claim 9, wherein the information generated by the one or more processors for the plurality of mobile stations operative in a cellular operating mode further comprises a congestion threshold to enable each of said plurality of mobile stations to determine whether to perform a switch to its Wi-Fi operating mode.

11. The communication apparatus of claim 9, wherein the information generated by the one or more processors further comprises identification of one or more of the plurality of Wi-Fi access points with which a particular mobile station receiving the information may communicate after it has switched to its Wi-Fi operating mode.

12. The communication apparatus of claim 11, wherein the information further comprises identifications of one or more of the plurality of Wi-Fi access points located respectively in a vicinity of said mobile stations, to allow each of the mobile stations to select another Wi-Fi access point upon moving from one location area to another, while operating at its Wi-Fi operating mode.

13. The communication apparatus of claim 9, wherein the one or more processors are further operative to enable provisioning to at least one of the plurality of mobile stations that has switched to its Wi-Fi operating mode, a notification to return to its cellular operating mode.

14. The communication apparatus of claim 13, wherein the notification to the at least one of the plurality of mobile stations to return to its cellular operating mode is included in a Cell Broadcast Service (CBS) sent to the at least one of the plurality of mobile stations along a path extending at least partially in the cellular communication network, while the at least one of the plurality of mobile stations is still at its Wi-Fi operating mode.

15. The communication apparatus of claim 13, wherein the notification to the at least one of the plurality of mobile stations to return to its cellular mode, is provided in response to receiving a message sent by the at least one of the plurality of mobile stations indicating that it is experiencing poor communication conditions in said Wi-Fi network.

* * * * *